United States Patent
Yang et al.

(10) Patent No.: US 11,271,760 B2
(45) Date of Patent: *Mar. 8, 2022

(54) MANAGING BLOCKCHAIN-BASED CENTRALIZED LEDGER SYSTEMS

(71) Applicant: Advanced New Technologies Co., Ltd., Grand Cayman (KY)

(72) Inventors: Xinying Yang, Hangzhou (CN); Benquan Yu, Hangzhou (CN); Yuan Zhang, Hangzhou (CN); Wenyuan Yan, Hangzhou (CN); Yize Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 57 days.

This patent is subject to a terminal disclaimer.

(21) Appl. No.: 16/829,866

(22) Filed: Mar. 25, 2020

(65) Prior Publication Data

US 2020/0228352 A1 Jul. 16, 2020

Related U.S. Application Data

(63) Continuation of application No. 16/713,966, filed on Dec. 13, 2019, now Pat. No. 10,728,046, which is a
(Continued)

(51) Int. Cl.
*H04L 29/06* (2006.01)
*H04L 9/32* (2006.01)

(52) U.S. Cl.
CPC ............ *H04L 9/3297* (2013.01); *H04L 9/321* (2013.01); *H04L 9/3236* (2013.01);
(Continued)

(58) Field of Classification Search
CPC ..... H04L 9/3297; H04L 9/321; H04L 9/3236; H04L 9/3247; H04L 2209/38; G06Q 2220/00
See application file for complete search history.

(56) References Cited

U.S. PATENT DOCUMENTS 6,182,139 B1 1/2001 Brendel
6,823,456 B1 11/2004 Dan et al.
(Continued)

FOREIGN PATENT DOCUMENTS

CN 107480990 12/2017
CN 108768630 11/2018
(Continued)

OTHER PUBLICATIONS

Zhang, Yuan, et al. "Chronos: Secure and accurate time-stamping scheme for digital files via blockchain." ICC 2019-2019 IEEE International Conference on Communications (ICC). IEEE, 2019. (Year: 2019).*

(Continued)

*Primary Examiner* — Shawnchoy Rahman
(74) *Attorney, Agent, or Firm* — Fish & Richardson P.C.

(57) ABSTRACT

Disclosed herein are methods, systems, and apparatus, including computer programs encoded on computer storage media, for managing blockchain-based centralized ledger systems. One of the methods includes: transmitting a timestamp request for a to-be-timestamped block in a blockchain to a trust time server by a ledger server in a centralized ledger system that stores data in the blockchain, the trust time server being associated with a trust time authority and independent from the centralized ledger system, the blockchain including a plurality of blocks storing transaction data, receiving a timestamp and associated signature for the to-be-timestamped block from the trust time server by the ledger server, and storing information of the timestamp and the associated signature for the to-be-timestamped block in the blockchain by the ledger server.

30 Claims, 7 Drawing Sheets

Related U.S. Application Data continuation of application No. PCT/CN2019/104067, filed on Sep. 2, 2019.

(52) U.S. Cl.
CPC ....... *H04L 9/3247* (2013.01); *G06Q 2220/00* (2013.01); *H04L 2209/38* (2013.01)

(56) References Cited

U.S. PATENT DOCUMENTS

| | | |
|---|---|---|
| 8,843,645 B2 | 9/2014 | Annamalaisami et al. |
| 9,294,479 B1 | 3/2016 | Koulomzin |
| 10,419,209 B1 | 9/2019 | Griffin et al. |
| 10,581,847 B1 | 3/2020 | Sun et al. |
| 10,608,829 B1 | 3/2020 | Yoshihama et al. |
| 10,742,423 B1 | 8/2020 | Yan et al. |
| 10,901,732 B1 * | 1/2021 | Nelson .................. H04L 9/3239 |
| 2002/0107811 A1 | 8/2002 | Jain et al. |
| 2014/0269776 A1 | 9/2014 | Bomfim et al. |
| 2015/0295720 A1 | 10/2015 | Buldas et al. |
| 2017/0346693 A1 | 11/2017 | Dix et al. |
| 2017/0353320 A1 | 12/2017 | Yang |
| 2018/0101684 A1 | 4/2018 | Murphy et al. |
| 2018/0322491 A1 | 11/2018 | Madisetti et al. |
| 2018/0324154 A1 * | 11/2018 | Crabtree ............... H04L 63/061 |
| 2018/0374094 A1 | 12/2018 | Kohli |
| 2019/0102409 A1 | 4/2019 | Shi et al. |
| 2019/0158274 A1 | 5/2019 | Tormasov et al. |
| 2019/0188710 A1 | 6/2019 | Mittal et al. |
| 2019/0238316 A1 | 8/2019 | Padmanabhan |
| 2019/0238327 A1 | 8/2019 | Li et al. |
| 2019/0280871 A1 | 9/2019 | Subramanian |
| 2020/0007311 A1 | 1/2020 | Oberhofer et al. |
| 2020/0012731 A1 | 1/2020 | Deshpande et al. |
| 2020/0076572 A1 | 3/2020 | Irazabal et al. |
| 2020/0076576 A1 | 3/2020 | Ahlback et al. |
| 2020/0076608 A1 | 3/2020 | Irazabal et al. |
| 2020/0076625 A1 | 3/2020 | Kass |
| 2020/0082349 A1 | 3/2020 | Maio |
| 2020/0112444 A1 | 4/2020 | Yoshihama et al. |
| 2020/0119906 A1 | 4/2020 | Das et al. |

FOREIGN PATENT DOCUMENTS

| | | |
|---|---|---|
| CN | 108881253 | 11/2018 |
| CN | 109034805 | 12/2018 |
| CN | 109086626 | 12/2018 |
| CN | 3425845 | 1/2019 |
| CN | 109450638 | 3/2019 |
| CN | 109726597 | 5/2019 |
| CN | 109815748 | 5/2019 |
| CN | 110601849 | 12/2019 |
| WO | WO 2018178750 | 10/2018 |
| WO | WO 2019007783 | 1/2019 |
| WO | WO 2019024126 | 2/2019 |

OTHER PUBLICATIONS

Kim et al., "A Survey of Scalability Solutions on Blockchain," 2018 International Conference on Information and Communication Technology Convergence, Oct. 2018, pp. 1204-1207.

Dennis et al., "Rep on the block: A next generation reputation system based on the blockchain," 2015 10th International Conference for Internet Technology and Secured Transactions (ICITST), Dec. 2015, pp. 131-138.

PCT International Search Report and Written Opinion in International Application No. PCT/CN2019/104067, dated May 28, 2020, 7 pages.

PCT International Search Report and Written Opinion in International Application No. PCT/CN2019/104068, dated May 29, 2020, 8 pages.

Xu et al., "Making Big Data Open in Edges: A Resource-Efficient Blockchain-Based Approach," IEEE Transactions on Parallel and Distributed Systems, Apr. 2019, 30(4):870-882.

Puthal et al., "Everything You Wanted to Know About the Blockchain: Its Promise, Components, Processes, and Problems," IEEE Consumer Electronics Magazine, Jul. 2018, 7(4):6-14.

Gipp et al., "Decentralized Trusted Timestamping using the Crypto Currency Bitcoin," arXivpreprint arXiv:1502.04015, Feb. 2015, 6 pages.

Extended European Search Report in European Application No. 19811887.9, dated Sep. 30, 2020, 7 pages.

Szalachowski, "(Short Paper) Towards More Reliable Bitcoin Timestamps," 2018 Crypto Valley Conference on Blockchain Technology (CVCBT), Jun. 2018, pp. 101-104.

Yang et al., "Blochckain-based publicly verifiable data deletion scheme for cloud storage," Journal of Network and Computer Applications, Dec. 2017, 103:185-193.

Extended European Search Report in European Application No. 19858712.3, dated Aug. 25, 2020, 8 pages.

U.S. Appl. No. 16/713,574, filed Dec. 13, 2019, Li et al.
U.S. Appl. No. 16/713,639, filed Dec. 13, 2019, Yan et al.
U.S. Appl. No. 16/713,841, filed Dec. 13, 2019, Li et al.
U.S. Appl. No. 16/713,899, filed Dec. 13, 2019, Li et al.
U.S. Appl. No. 16/713,966, filed Dec. 13, 2019, Yang et al.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

\* cited by examiner

MANAGING BLOCKCHAIN-BASED CENTRALIZED LEDGER SYSTEMS

CROSS-REFERENCE TO RELATED APPLICATIONS

This application is a continuation of and claims the benefit of priority to U.S. patent application Ser. No. 16/713,966, filed on Dec. 13, 2019, which is a continuation of PCT Application No. PCT/CN2019/104067, filed on Sep. 2, 2019, which are hereby incorporated by reference in their entirety.

TECHNICAL FIELD

This specification relates to managing blockchain-based centralized ledger systems.

BACKGROUND

A ledger is typically used to record a history of transactions, such as economic and financial activities in an organization. Applications with ledger-like functionality, such as custom audit tables or audit trails created in relational databases, have been built to maintain an accurate history of applications' data. However, building such applications is time-consuming and prone to human error. Also, as the relational databases are not inherently immutable, any changes to the data are hard to track and verify.

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. Blockchain networks perform a consensus process to validate each transaction before the transaction can be added to the blockchain networks, which can be time-consuming, ineffective, and complicated.

Therefore, it would be desirable to develop a ledger system that can effectively and securely manage transactions while providing immutability, reliability, trustworthiness, and verifiability of the transactions.

SUMMARY

This specification describes technologies for managing blockchain-based centralized ledger systems. These technologies generally involve a blockchain-based centralized ledger system (e.g., a universal auditable ledger service system) that adopts a data structure of a blockchain to leverage immutability, reliability, and trustworthiness of data stored on the blockchain. The centralized ledger system can obtain trust timestamp information from a trust time server that is independent from the centralized ledger system (e.g., a third-party, globally acknowledged time authority). The centralized ledger system can leverage the established trust on the timestamp information provided by the trust timer server and integrate the trust timestamp information into the centralized ledger system for the data stored on the blockchain, which can further enhance credibility, auditability, and legality of the stored data.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
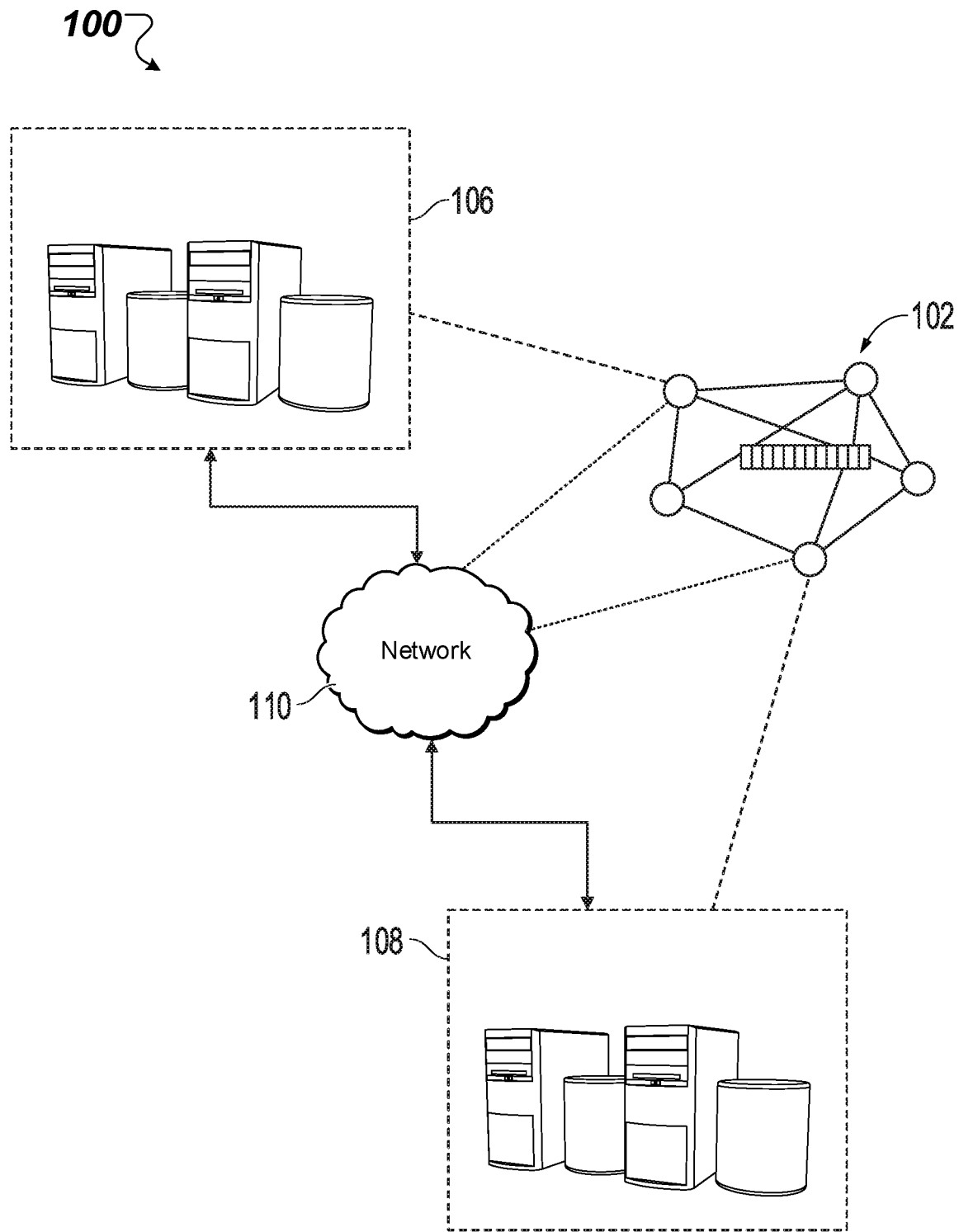
FIG. 1 is a diagram illustrating an example of an environment that can be used to execute embodiments of this specification.

This specification describes technologies for managing blockchain-based centralized ledger systems. These technologies generally involve a blockchain-based centralized ledger system (e.g., a universal auditable ledger service system) that adopts a data structure of a blockchain to leverage immutability, reliability, and trustworthiness of data stored on the blockchain. The centralized ledger system can obtain trust timestamp information from a trust time server that is independent from the centralized ledger system (e.g., a third-party, globally acknowledged time authority). The centralized ledger system can leverage the established trust on the timestamp information provided by the trust timer server and integrate the trust timestamp information into the centralized ledger system for the data stored on the blockchain, which can further enhance credibility, auditability, and legality of the stored data.

The techniques described in this specification produce several technical effects. In some embodiments, the blockchain-based centralized ledger system can be a ledger system based on centralization, which can provide a cryptographically verifiable state-independent data ledger storage with time-critical auditing (with non-repudiation and temper-resistance). In some embodiments, the blockchain-based centralized ledger system can provide ledger services based on a cloud platform featuring centralized endorsement with credibility and neutrality. The blockchain-based centralized ledger system can provide highly reliable and high-performance auditable streaming ledger services by leveraging both a blockchain system's high credibility and a centralized system's high performance and low latency for handling various types of data and logs with auditing requirements, traceability, and tracking.

In some embodiments, the blockchain-based centralized ledger system can include a central trusted authority that provides transparent, immutable, and cryptographically verifiable data that are stored in blocks of a blockchain data structure. In some embodiments, the stored data can be in a log format, including, for example, not only for transaction logs but also other transaction data and block data. Due to the existence of the central trusted authority, the blockchain-based centralized ledger system does not need to perform consensus processes to establish trust, which can result in significant time- and cost-saving. In some embodiments, the blockchain-based centralized ledger system can be more efficient compared to a typical blockchain-based distributed or decentralized ledger system. In some embodiments, the blockchain-based centralized ledger system can provide a cloud-based storage service with enhanced trust, efficiency, and storage performance.

In some embodiments, the blockchain-based centralized ledger system can enhance
credibility, auditability, and legality of stored data on a blockchain. For example, the centralized ledger system can interface with a trust time server and provide trust timestamp information of the trust time server to clients of the blockchain-based centralized ledger system. The trust time server is independent from the centralized ledger system. The trust time server can be associated with a third-party trust time authority that provides accurate time services and can be acknowledged or trusted, for example, globally, by the public, auditing entities (such as companies, institutions, or organizations), and/or legal entities (such as courts or governments). As the trustworthiness of the timestamp information provided by the trust time server is acknowledged, integrating the timestamp information of the trust time server into the centralized ledger system for the data stored on the blockchain can further enhance credibility, auditability, and legality of the data stored in the centralized ledger system.

In some embodiments, the blockchain-based centralized ledger system features respective rights of parties or participants of the blockchain-based centralized ledger system. For example, a client of the blockchain-based centralized ledger system can have a right of providing a signature for storing transaction data on a blockchain in the centralized ledger system such that the client cannot repudiate the transaction data. In some embodiments, the centralized ledger system has a right of providing a signature for acknowledging the storage of the transaction data such that the centralized ledger system cannot deny storing the transaction data. In some embodiments, a trust time server has a right of providing a signature for trust timestamp information for the transaction data stored on the centralized ledger system such that the trust time server cannot deny the trust timestamp information. In some embodiments, the three respective rights of the three parties (the client, the ledger system, and the trust time server) are independent from each other, which can further enhance creditability and auditability of the transaction data stored in the centralized ledger system.

In some embodiments, the blockchain-based centralized ledger system can provide enhanced orderliness and authenticity of transaction data stored on the blockchain. For example, the blockchain-based centralized ledger system can transmit trust timestamp requests for transaction data stored on a blockchain to the trust time server, and the trust time server can provide trust timestamp information such as timestamps and associated signatures, for example, to authenticate or endorse the time of the transaction data stored on a blockchain. The centralized ledger system can store the trust timestamp information, e.g., as transactions, in the blockchain. The trust timestamp information can be used to verify orderliness and authenticity of the transaction data stored on the blockchain, which in turn can provide enhanced creditability, auditability and legality of the transaction data stored on the blockchain.

In some embodiments, the blockchain-based centralized ledger system can provide an efficient, fast, and reliable method for verification of validity of the stored transaction data on the blockchain and further enhance the credibility and auditability of the stored transaction data. For example, a ledger server in the centralized ledger system can periodically transmit individual timestamp requests for to-be-timestamped blocks generated in the blockchain to the trust time server at a predetermined triggering time period. Each of the to-be-timestamped blocks can be the most recent block generated in the blockchain when the respective timestamp request is transmitted. After receiving respective trust timestamps and associated signatures for the to-be-timestamped blocks from the trust time server, the ledger server stores information of the respective trust timestamps and associated signatures for the to-be-timestamped blocks in blocks immediately subsequent to the to-be-timestamped blocks in the blockchain, respectively. The blocks storing the information of the respective trust timestamps and associated signatures can be referred to as timestamped blocks in the blockchain.

In some embodiments, the timestamped blocks can be anchored (or linked) together in the blockchain, such that the centralized ledger system can quickly trace blocks (and/or transactions) associated with trust timestamps and verify correctness of the anchored relationship between the timestamped blocks. The terms "anchored" and "linked" can be used interchangeably herein. In some embodiments, the timestamped blocks being anchored together can be implemented by that a timestamped block stores information that uniquely identifies a timestamped block immediately before the timestamped block among the timestamped blocks in the blockchain. In some embodiments, the timestamped blocks being anchored together can be implemented by that a timestamp request of a to-be-timestamped block including information of a previous timestamped block that is the most recent timestamped block generated in the blockchain.

The information can include at least one of a hash of the previous timestamped block or a block identifier of the previous timestamped block, where each of multiple blocks in the blockchain is associated with a respective block identifier and is stored in order in the blockchain according to the respective block identifier.

In some embodiments, after receiving the timestamp request, the trust time server can generate a respective trust timestamp and associated signature encrypting the trust timestamp and the timestamp request including the information of the previous timestamped block. Information of the respective trust timestamp and associated signature can be then stored in a timestamped block immediately subsequent to the previous timestamped block among the timestamped blocks in the blockchain. In such a way, these two timestamped blocks are anchored to each other.

Moreover, as the timestamp request including the information of the previous timestamped block is included in the signature of the trust time server, the anchored relationship between the two timestamped blocks is also endorsed by the trust time server, which can further enhance the credibility and auditability of the stored transaction data on the blockchain.

In some embodiments, a second timestamped block immediately subsequent to a first timestamped block among the timestamped blocks in the blockchain stores information of the first timestamped block. The information of the first timestamped block includes at least one of the hash of the first timestamped block or the first respective block identifier of the first timestamped block. In such a way, the first and second timestamped blocks are anchored to each other. Moreover, blocks in the blockchain are anchored to each other by storing a hash of a preceding block immediately before it in the blockchain. The second timestamped block can also include a hash of a preceding block immediately before the second timestamped block in the blockchain.

In some embodiments, the blockchain-based centralized ledger system can further enhance credibility and auditability of the stored transaction data on the blockchain without frequently transmitting timestamp requests to cause high costs. For example, the first timestamped block and the second timestamped block may not be adjacent to each other among the multiple blocks in the blockchain and there can be one or more non-timestamped blocks between the first timestamped block and the second timestamped block. The one or more non-timestamped blocks do not include trust timestamp information obtained from the trust time server. A non-timestamped block can be referred to as a non-externally-timestamped block as it can include an internal (or local) timestamp generated by the ledger server or the centralized ledger system that generates the block. The non-externally-timestamped can be, for example, a to-be-timestamped block. By anchoring the first and second timestamped blocks together, the one or more non-timestamped blocks between them can be determined to generate at time points between a first respective timestamp included in the first timestamped block and a second respective timestamp included in the second timestamped block, which can further enhance the credibility and auditability of the stored transaction data on the blockchain and reduce the overall cost of the centralized ledger system for obtaining trust timestamp information from the trust time server.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a hash of the previous block. Each block also includes a local timestamp (e.g., provided by a computing device that generates the block or a computing system that manages the blockchain), its own hash, and one or more transactions. For example, the block can include a block header and a block body. The block header can include the local timestamp, its own hash, and a hash of the previous block. The block body can include payload information such as the one or more transactions (or transaction data). The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

In some embodiments, a centralized ledger system can also adopt the data structure of a blockchain to leverage immutability, reliability, and trustworthiness of data stored on a blockchain. In some embodiments, such a centralized ledger system can be referred to as a blockchain-based centralized ledger system or a universal auditable ledger service system. In some embodiments, the blockchain-based centralized ledger system can include a central trusted authority that provides transparent, immutable, and cryptographically verifiable data that are stored in blocks of a blockchain data structure. The stored data can be in a log format, including, for example, not only for transaction logs but also other transaction data and block data. Due to the existence of the central trusted authority, the blockchain-based centralized ledger system does not need to perform consensus processes to establish trust. In some embodiments, the blockchain-based centralized ledger system can be more efficient compared to a typical blockchain-based distributed or decentralized ledger system. In some embodiments, the blockchain-based centralized ledger system can provide a cloud-based storage service with enhanced trust, efficiency, and storage performance.

In some embodiments, the centralized ledger system can be a node of a blockchain network. For example, the centralized ledger system can be a non-consensus node in the blockchain network and can provide highly reliable and high-performance auditable streaming ledger services for the consensus nodes or other non-consensus nodes in the blockchain network, or entities outside of the blockchain network.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing devices 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing devices 106, 108 host one or more computer-implemented services for interacting with the consortium blockchain network 102. For example, the computing device 106 can host computer-implemented services of a first entity (e.g., user A), such as a transaction management system that the first entity uses to manage its transactions with one or more other entities (e.g., other users). The computing device 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing devices 106, 108 provide nodes of the first entity, and second entity respectively, which participate in the consortium blockchain network 102.

Figure 2:
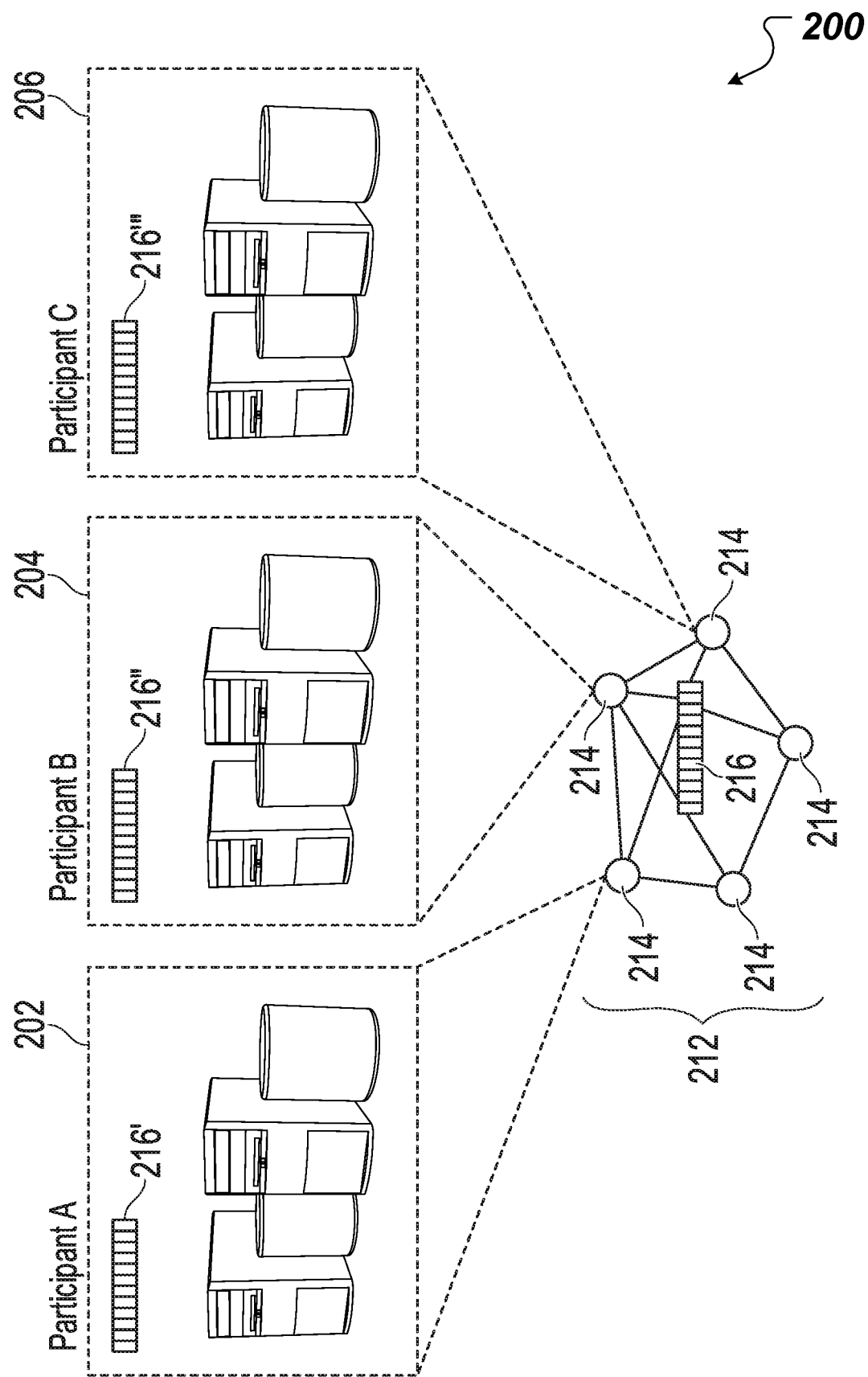
FIG. 2 is a diagram illustrating an example of an architecture in accordance with embodiments of this specification.

FIG. 2 is a diagram illustrating an example of an architecture 200 in accordance with embodiments of the specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including multiple nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, and 206 store respective, complete copies 216', 216", and 216''' of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

Figure 3:
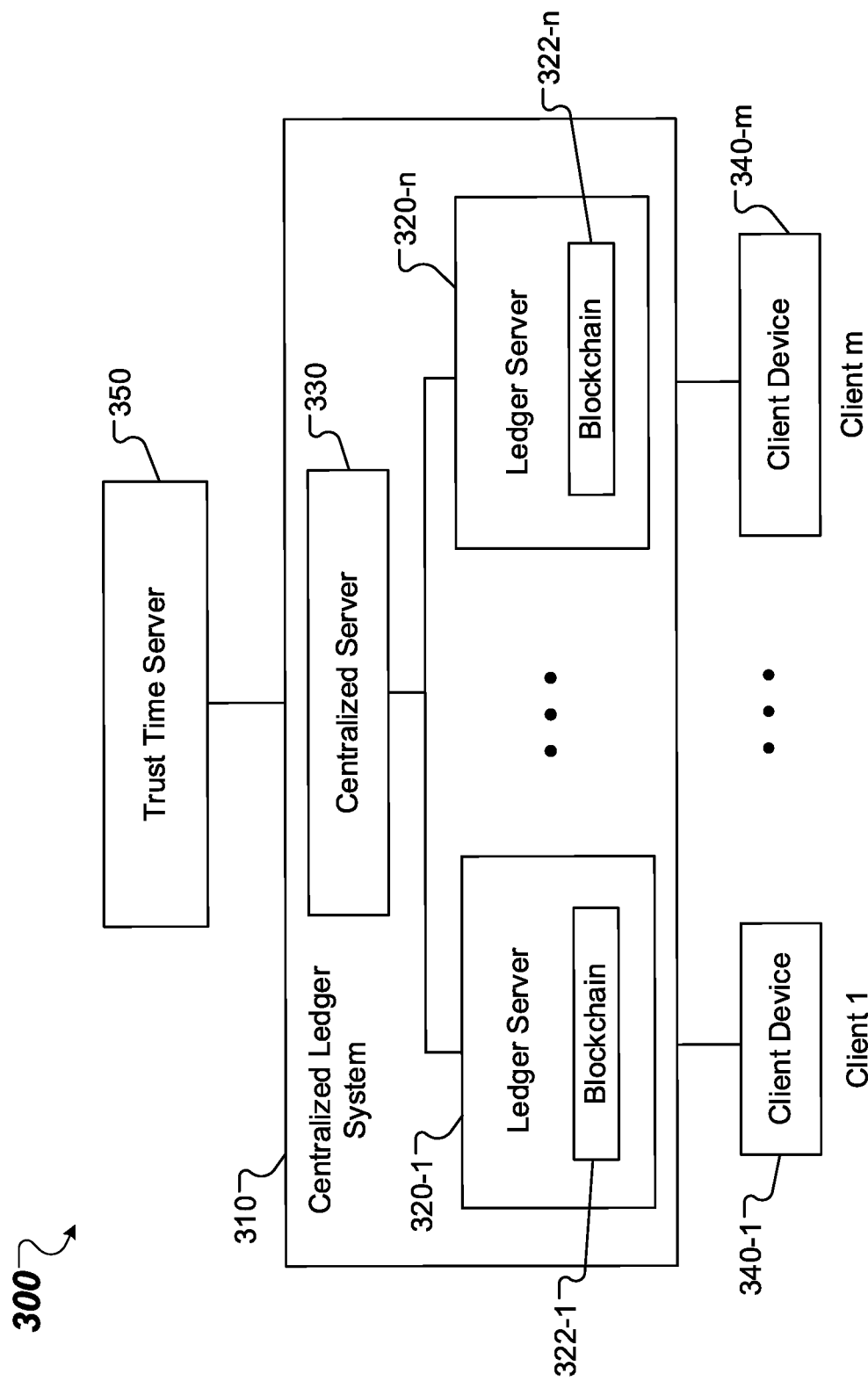
FIG. 3 is a diagram illustrating an example of an environment implementing trust timestamp services in a blockchain-based centralized ledger system in accordance with embodiments of this specification.

FIG. 3 is a diagram illustrating an example of an environment 300 in accordance with embodiments of this specification. The environment 300 implements trust timestamp services in a blockchain-based centralized ledger system 310. The blockchain-based centralized ledger system 310 adopts a data structure of a blockchain to leverage immutability, reliability, and trustworthiness of data stored on the blockchain. The centralized ledger system 310 can also integrate trust timestamp information from a trust time server 350 that is independent from the centralized ledger system 310 for the data stored on the blockchain, which can greatly enhance credibility, auditability, and legality of the stored data.

In some embodiments, the centralized ledger system 310 can be a cloud computing system including one or more computers interconnected by a network. The centralized ledger system 310 can include any appropriate computing devices. Examples of computing devices include, without limitation, a server, a desktop computer, a laptop computer, a tablet computing device, and a smartphone.

In some examples, the centralized ledger system 310 includes one or more ledger servers 320-1 to 320-n (collectively referred to herein as "320"). Each ledger server 320 can host one or more computer-implemented services for interacting with at least one client, e.g., client 1 or client m. The client can be an individual, a company, an organization, a financial institution, an insurance company, or any other type of entity. In some cases, a client can be associated with one or more ledger servers. In some cases, a ledger server can be associated with one or more clients.

The ledger server 320 can host a transaction management system to provide a ledger service for a client, e.g., client 1 or client m, and the client can use one or more associated devices, e.g., client device 340-1 or 340-m (collectively referred to herein as "340"), to access the transaction management system to use the ledger service. The client device 340 can include any appropriate computing devices.

The ledger service provided by the ledger server 320 can enable a client to store its data in a transparent, immutable, and cryptographically verifiable blockchain data structure, e.g., a blockchain. Each ledger server, e.g., 320-1 or 320-n, can maintain a respective blockchain, e.g., 322-1 to 322-n (collectively referred to herein as "322"). In some embodiments, each ledger server 320 can perform similar functions to those of a blockchain network node (e.g., the computing device 106 or 108 of FIG. 1 or the computing device 202, 204 or 206 of FIG. 2) in a blockchain network. For example, each ledger server 320 can generate blocks and add the blocks to the blockchain 322. In some embodiments, each ledger server 320 can function as a central trusted authority and does not need to perform consensus processes with other nodes (e.g., other client devices or other leger servers) to establish trust. For example, each ledger server 320 can perform similar functions to those of a non-consensus node of a blockchain network. In some embodiments, each ledger server 320 can be the single node that creates and/or manages the blockchain 322.

In some embodiments, each client can be associated with a respective blockchain. In some embodiments, one or more clients can be associated with a same blockchain. In some embodiments, a blockchain can be associated with one or more clients.

In some examples, client 1 is an individual, a company, or an organization. The client device 340-1 associated with client 1 can interact with the ledger server 320-1 to obtain a ledger service of the centralized ledger system 310. For example, the client device 340-1 can access the blockchain 322-1 to read and store transaction data associated with client 1 through the ledger server 320-1. The client device 340-1 can include, for example, any suitable computer, module, server, or computing element programmed to perform methods described herein. In some embodiments, the client device 340-1 can include a user device, such as, a personal computer, a smartphone, a tablet, or other handheld device.

In some examples, client m is an insurance company or a financial institution such as a bank that has a number of individual users. The client device 340-m associated with client m can interact with the ledger server 320-m to provide a ledger service of the centralized ledger system 310 to the individual users of client m. For example, the client device 340-m can access the blockchain 322-m to read and store transaction data associated with client m through the ledger server 320-m. In some cases, a user of client m can request a ledger service of the centralized ledger system 310 through the client device 340-m.

The data stored in a blockchain can be in a log format, including, for example, not only for transaction logs but also other transaction data and block data. Each blockchain stores data in a way that the data is immutable and cannot be altered or deleted. Using cryptography can enable verification that there have been no unintended modification to the stored data. Thus, data recorded on the blockchain are reliable and trustworthy.

The blockchain can include one or more blocks. Each block in the blockchain is linked to a previous block immediately before it in the chain by including a hash of the previous block. Each block also includes a local timestamp, its own hash, and one or more transactions or transaction data. For example, the block can include a block header and a block body. The block header can include the local timestamp, its own hash, and a hash of the previous block. The block body can include payload information such as the one or more transactions or transaction data. The local timestamp indicates a time point or instance when the block is generated and/or added to the blockchain. The local timestamp can be internally provided by the ledger server 320, the centralized ledger system 310, or a central trusted authority associated with the centralized ledger system 310.

In some embodiments, the ledger server 320 sequentially receives a series of transactions associated with a client and then stores the transactions in blocks of a blockchain. In some embodiments, the ledger server 320 can receive one or more transactions, for example, from one or more client devices 340. The received transactions can be stored in a data buffer. The ledger server 320 can generate a block to store the transactions, for example, including transferee and transferor accounts, transaction amounts, or other types of information of the transactions.

In some embodiments, the ledger server 320 can store the transactions in a stream, array, or another data structure (referred to as a transaction storage stream). For example, the transactions can be sequentially stored in the transaction storage stream according to time of occurrence of the transactions. Each transaction can have a respective transaction identifier in the transaction storage stream, for example, according to its time of occurrence. The ledger server 320 can generate blocks to include a number of hashes for the transactions. In some embodiments, the hashes for the transactions can be stored according to the time of occurrence of corresponding transactions, instead of according to values of the hashes. In some embodiments, the hashes for the transactions can be hashes of the transactions or hashes of the respective transaction identifiers of the transactions. A block can include a hash of a previous block immediately before it such that the blocks are anchored with each other to form a blockchain (or a block storage stream). In such a way, the blocks do not store details of the transactions. The details of the transactions can be stored in the transaction storage stream in the ledger server 320 or a separate repository in the centralized ledger system 310.

The ledger server 320 can also provide trust timestamp services to a client. In some embodiments, the ledger server 320 can request trust timestamps from the trust time server 350 for data stored in the ledger server 320, which can enhance credibility, auditability, and legality of the stored data. The trust time server 350 is independent from the centralized ledger system 310. The trust time server 350 can be associated with a third-party trust time authority that provides accurate (or true) time services and can be, for example, globally, acknowledged or trusted by the public, auditing entities (such as companies, institutions, or organizations), and/or legal entities (such as courts or governments). Trust timestamp information provided by the trust time server 350 can be acknowledged or considered as legality without notarization and/or forensic identification. For example, the trust time server 350 can be a UTC (Coordinated Universal Time)/GMT (Greenwich Mean Time) server providing UTC/GMT time services. The trust time server 350 can also be a time server of a trust authority providing standard times for a country or a region.

The centralized ledger system 310 can communicate with the trust time server 350 through a network, e.g., the network 110 of FIG. 1. In response to receiving a timestamp request from a customer, e.g., the ledger server 320, the trust time server 350 can generate a timestamp indicating a time point when receiving the timestamp request. The trust time server 350 can generate a signature to authenticate the timestamp and the timestamp request (e.g., a textual or imaging copy of the timestamp request). For example, the trust time server 350 can use its private key to sign, thus cryptographically encrypting, the timestamp and the timestamp request. The trust time server 350 can generate a digital timestamp certificate including the timestamp and the associated signature and transmit timestamp information including the timestamp certificate to the customer. The trust time server 350 can provide the trust timestamp service with a cost, e.g., $1 per timestamp request.

In some embodiments, the ledger server 320 transmits to the trust time server 350 a timestamp request for authenticating a time of a block in a blockchain. The timestamp request can include information of the block, e.g., a hash of the block. The time server 350 can generate and transmit timestamp information including the timestamp and associated signature for the block or a hash of the timestamp and associated signature. After receiving the timestamp information from the trust time server 350, the ledger server 320 can store the timestamp information or a hash of the timestamp information into a following block immediately subsequent to the block in the blockchain. In some embodiment, the timestamp information can be stored as a transaction in the following block. A block storing the timestamp information can be referred to be a timestamped block. The timestamped block can be a block that includes only the timestamp information, or a block that also include other transactions in addition to the timestamp information. Timestamped blocks in the blockchain can be anchored or linked to each other in the blockchain.

In some embodiment, the ledger server 320 can periodically transmit timestamp requests for to-be-timestamped blocks in a blockchain to the trust time server 350 with a predetermined triggering time period. For example, the ledger server 320 can include a timer counting a time after transmitting a first timestamp request. When the timer counts the predetermined triggering time period, the ledger server 320 can be triggered to transmit a second timestamp request immediately subsequent to the first timestamp request. The centralized ledger system 310 or the ledger server 320 can provide timestamp services with different costs corresponding to different triggering time periods. The triggering time period can be predetermined by a client (or a user) associated with the blockchain or the ledger server 320. For example, the client can choose a timestamp service corresponding to a respective cost and a respective triggering time period.

In some embodiments, the ledger server 320 may not transmit timestamp requests to the trust time server 350 periodically. For example, the ledger server 320 may transmit timestamp requests on demand or based on the number of the blocks generated by the ledger server 320. For example, the ledger server 320 may transmit a timestamp request of a block upon receiving instructions from the client, or upon a predetermined number of blocks have been recently added to the blockchain 322.

In some embodiments, the ledger server 320 may generate blocks periodically at a predetermined time period of block generation. The predetermined triggering time period can be the same or different from the time period of block generation. The predetermined triggering time period can be longer than the time period of block generation so that not every block is being timestamped, for example, due to the cost of obtaining the timestamp from the trust time server 350. In some embodiments, the ledger server 320 may not generate blocks periodically. For example, the ledger server 320 may generate blocks on demand or based on the number of the transactions received by the ledger server 320. For example, the ledger server 320 may generate a new block upon receiving a predetermined number of transactions.

In some embodiment, the ledger server 320 can include one or more application programming interfaces (APIs) that is configured to communicate with the trust time server 350. An API can include a set of subroutine definitions, communication protocols, and tools for building software, and defines functionality provided by a program (module, library) and allows abstraction from exactly how this functionality is implemented. Software components interact with each other through the APIs. In some embodiment, the ledger server 320 can include one or more APIs that can implement functionalities of receiving a hash of a to-be-timestamped block as an input for a timestamp request, transmitting the timestamp request to the trust time server 350, and receiving trust timestamp information, e.g., a digital timestamp certificate or a timestamp and associated signature, sent by the trust time server 350.

The ledger server 320 can include one or more APIs that are configured to communicate with a client device 340 associated with a client. The one or more APIs can implement functionalities such as receiving a request for a timestamp service from the client device 340, listing different timestamp services with different costs and different triggering time periods, receiving a selection among the timestamp services from the client device 340, and transmitting or displaying a corresponding cost with a corresponding triggering time period to the client device 340. In some embodiment, the one or more APIs can also implement functionalities such as receiving a request for verifying or auditing transactions stored on a blockchain associated with the client and transmitting a verification or audition result to the client device 340. As discussed with further details in FIGS. 4A and 4B, the one or more APIs can also implement other functionalities such as receiving transactions or transaction data and client signatures from the client device 340 and transmitting a ledger signature indicating acknowledging the receipt or storage of the transactions or transaction data and/or the client signatures.

In some embodiments, the centralized ledger system 310 includes a centralized server 330. The centralized server 330 can be in communication with the number of ledger servers 320 in the centralized ledger system 310. In some embodiments, the ledger servers 320 communicates with the client devices 340 through the centralized server 330. For example, the centralized server 330 can receive data from a client device 340 and send the data to a ledger server 320 corresponding to (or assigned to) the client device 340.

In some embodiments, the centralized server 330 can maintain a standard time server for the centralized ledger system 310 and can provide internal timestamps (and/or associated signatures) to the ledger servers 320. For example, when a ledger server 320 generates a new block, the ledger server 320 can obtain an internal timestamp (and/or associated signature) from the centralized server 330 and store the internal timestamp (and/or associated signature) in the new block.

In some embodiments, each of the ledger servers 320 communicates with the trust time server 350 through the centralized server 330. For example, the ledger servers 320 can transmit original timestamp requests to the centralized server 330 and the centralized server 330 can transmit the original timestamp requests or centralized server timestamp requests associated with the timestamp requests to the trust time server 350, e.g., through a centralized API in the centralized server 330. The centralized server 330 can provide trust timestamp information obtained from the trust time server 350 to the ledger servers 320. In some other embodiments, as described above, each of the ledger servers 320 can communicate with the trust time server 350 directly without the centralized server 330.

Figure 4A:
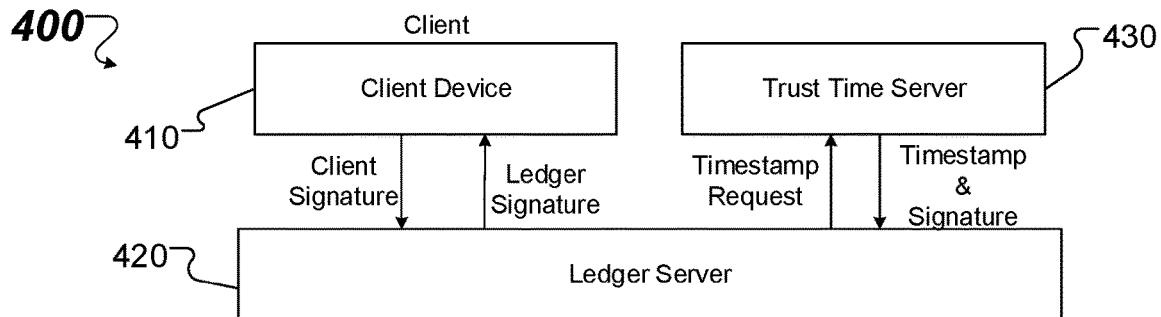
FIG. 4A is a diagram illustrating an example of a blockchain-based centralized ledger system for implementing a trust timestamp service in a single ledger server associated with a single client in accordance with embodiments of this specification.

FIG. 4A is a diagram illustrating an example of a blockchain-based centralized ledger system 400 for implementing a trust timestamp service in a single ledger server associated with a single client in accordance with embodiments of this specification. The blockchain-based centralized ledger system 400 can include a single ledger server 420 dedicated to provide a ledger service to a single client associated with a client device 410. The blockchain-based centralized ledger system 400 can be an example of the centralized ledger system 310 of FIG. 3. For example, the ledger server 420 can be an example of the ledger server 320-1 of FIG. 3. The client device 410 can be an example of the client device 340-1 of FIG. 3. The client uses the client device 410 to access the ledger service provided by the ledger server 420, in the blockchain-based centralized ledger system 400. The ledger server 420 can also provide a trust timestamp service to the client by communicating with a trust time server 430, which can be, for example, the trust time server 350 of FIG. 3.

The ledger server 420 can provide the ledger service and the trust timestamp service exclusively to the client. The ledger server 420 can store transaction data associated with the client in a blockchain exclusively for the client and independent (or separate) from other clients in the centralized ledger system 400. The ledger server 420 can request and store trust timestamp information exclusively for the transaction data associated with the client stored in the blockchain in the ledger server 420. The client can have an administrative right for storing transactions in the blockchain. In some cases, the client can provide to a third party a secondary ledger right that allows the third party to store transactions in the blockchain associated with the client.

In some embodiments, when a transaction (or transaction data) associated with the client is stored in the ledger server 420, the client can use the client device 410 to transmit a client signature to the ledger server 420. The client signature can indicate that the client acknowledges that the transaction has been completed and/or is to be stored in the ledger server 420. Thus, the client cannot repudiate the transaction.

In some embodiments, after receiving and/or storing the transaction (or the transaction data) in the ledger server 420 (e.g., in a blockchain), the ledger server 420 can transmit a ledger signature to the client device 410. The ledger signature can indicate that the ledger server 420 acknowledges the receipt and/or storage of the transaction. Thus, the ledger server 420 cannot deny storing the transaction.

In some embodiments, the ledger server 420 can transmit to the trust time server 430 a timestamp request for transactions that are associated with the client and stored in the ledger server 420. The trust time server 430 can provide a timestamp and associated signature for the transactions to the ledger server 420. The timestamp signature can include information of the transactions. Thus, the trust time server 430 cannot deny that its endorsement of time of the transactions and the timestamps for the transactions are trustworthy.

In some embodiments, the three respective rights of the three parties (the client, the ledger server, and the trust time server) are independent from each other, which can enhance creditability and auditability of the transaction data stored in the centralized ledger system.

Figure 4B:
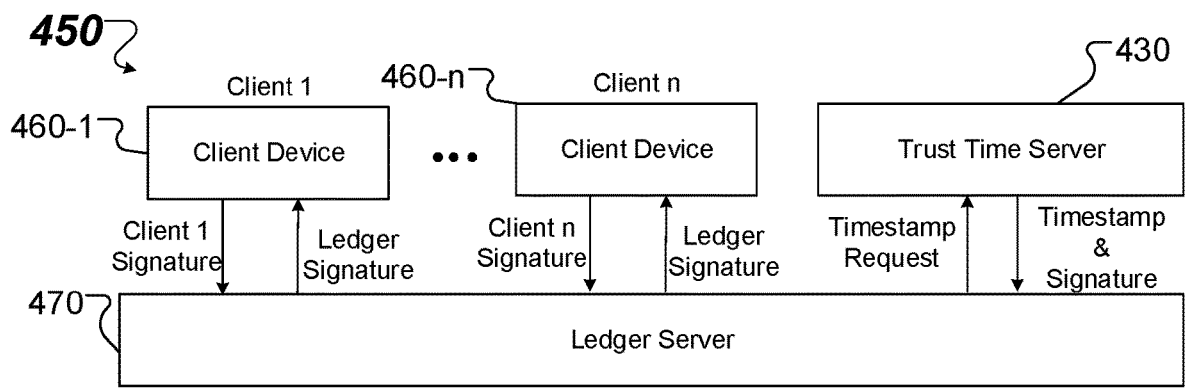
FIG. 4B is a diagram illustrating an example of a blockchain-based centralized ledger system for providing a trust timestamp service to multiple clients by a joint ledger server in accordance with embodiments of this specification.

FIG. 4B is a diagram illustrating an example of a blockchain-based centralized ledger system 450 for providing a trust timestamp service to multiple clients by a joint ledger server in accordance with embodiments of this specification. The blockchain-based centralized ledger system 450 can include a single joint ledger server 470 for providing a ledger service to multiple clients, client 1 to client n. The blockchain-based centralized ledger system 450 can be another example of the centralized ledger system 310 of FIG. 3. For example, the joint ledger server 470 can be an example of the ledger server 320 of FIG. 3. Each client, client 1 to client n, can be associated with a respective client device, 460-1 to 460-n. In some embodiments, the client devices 460-1 to 460-n can be examples of the client device 340-1 or 340-m of FIG. 3. Each client can use its respective client device 460 to access the ledger service provided by the ledger server 420, in the blockchain-based centralized ledger system 450. As an example, the clients can include multiple financial institutions such as customer banks.

Each client can use its associated client device to store transactions (or transaction data) in a joint blockchain shared with other clients. Similar to FIG. 4A, each client can transmit a respective client signature to the ledger server 470 and the ledger server 470 can return a corresponding ledger signature to the client. The ledger server 470 can transmit timestamp requests for the transactions stored in the joint blockchain to the trust time server 430 and receive and store timestamp information for the transactions in the joint blockchain.

Figure 5:
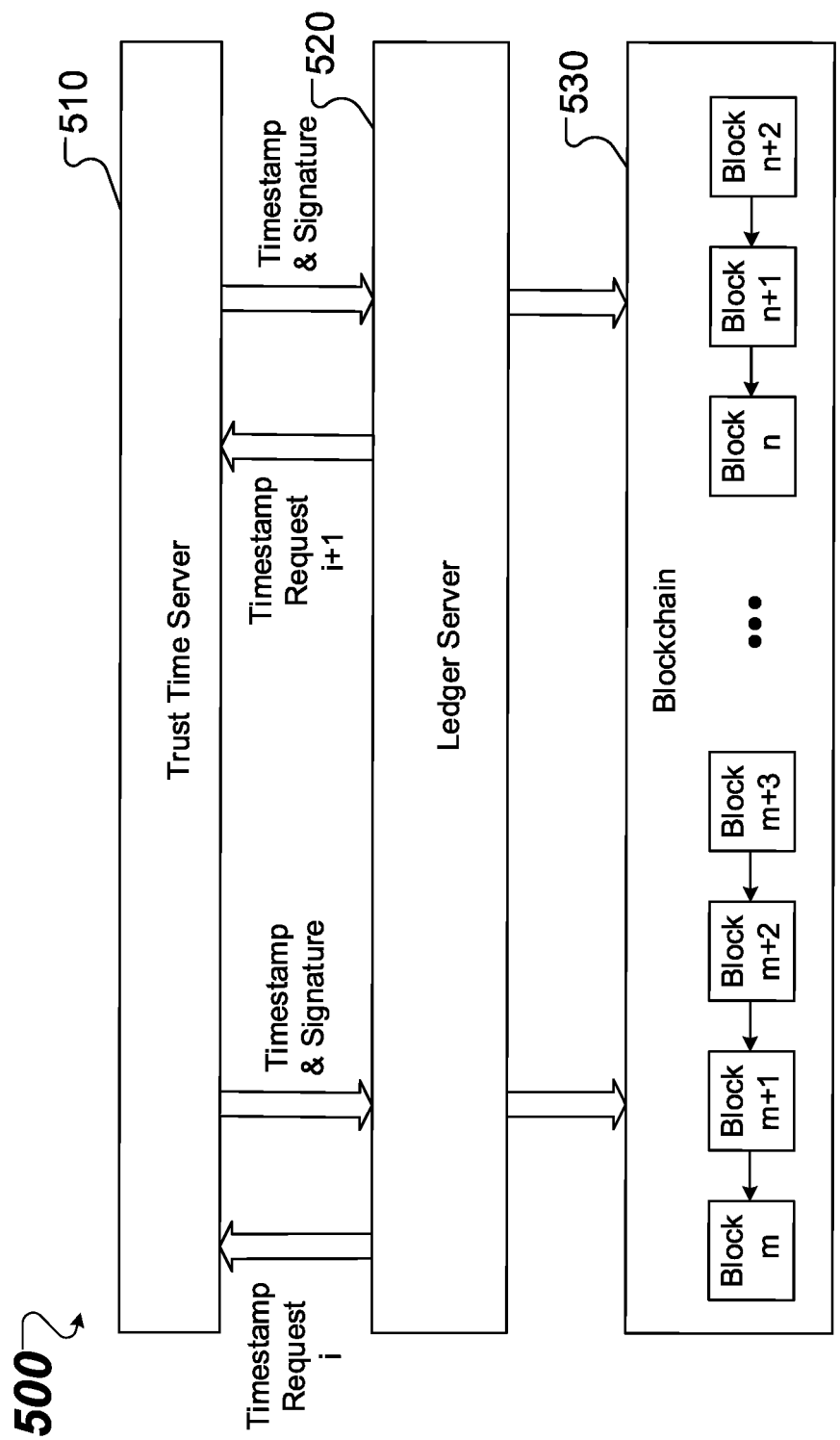
FIG. 5 is a diagram illustrating an example of a process of integrating trust timestamp information for transaction data into a blockchain-based centralized ledger system in accordance with embodiments of this specification.

FIG. 5 is a diagram illustrating an example of a process 500 for integrating trust timestamp information for transaction data into a blockchain-based centralized ledger system in accordance with embodiments of this specification. The blockchain-based centralized ledger system can be the centralized ledger system 310 of FIG. 3. The centralized ledger system can include a ledger server 520, e.g., the ledger server 320 of FIG. 3. The ledger server 520 can store transaction data in a blockchain 530. The centralized ledger system can receive trust timestamp information for the stored transaction data from a trust time server 510. The trust time server 510 is independent from the centralized ledger system and can be an example of the time server 350 of FIG. 3 or the time server 430 of FIGS. 4A-4B. As the trustworthiness of timestamp information provided by the trust time server 510 is acknowledged, integrating the trust timestamp information of the trust time server 510 into the centralized ledger system for data stored on the blockchain 530 can further enhance credibility, auditability, and legality of the stored data.

The blockchain 530 includes a number of blocks, e.g., block m to block n+2. Each block has a block identifier, e.g., m, m+1, m+2, m+3, n, n+1, n+2, and is sequentially added to the blockchain 530, for example, according to a chronological order. Each block in the blockchain 530 can be linked to a previous block immediately before it in the blockchain 530 by including a hash of the previous block. For example, block m+1 can include a hash of the previous block, block m. In some instances, the block m can be the first block, i.e., the genesis block of the blockchain 530. In some embodiments, each block also includes an internal timestamp, its own hash, and one or more transactions or transaction data. The internal timestamp indicates a time point when the block is generated and added to the blockchain. The internal timestamp can be internally provided by the centralized ledger system or a central trusted authority associated with the centralized ledger system.

In some embodiments, the ledger server 520 can periodically transmit a timestamp request for a block in the blockchain 530 to the trust time server 510 with a triggering time period.

The triggering time period can be the same or different from a time period of block generation. In some embodiments, the triggering time period can be longer than the time period of block generation so that not every block is being timestamped, for example, due to the cost of obtaining the timestamp from the trust time server 510.

In some embodiments, the ledger server 520 may not generate blocks periodically. For example, the ledger server 520 may generate blocks on demand or based on the number of the transactions received by the ledger server 520. For example, the ledger server 520 may generate a new block upon receiving a predetermined number of transactions.

In some embodiments, the ledger server 520 may not transmit timestamp requests to the trust time server periodically. For example, the ledger server 520 may transmit timestamp requests on demand or based on the number of the blocks generated by the ledger server 520. For example, the ledger server 520 may transmit a timestamp request of a block upon receiving instructions from the client, or upon a predetermined number of blocks have been recently added to the blockchain.

In some embodiments, when a timestamp request of a block is transmitted the block can be the most recent block generated in the blockchain 530. The timestamp request can include a hash of the most recent block or other information to uniquely identify the most recent block. For example, when the ledger server 520 is triggered to transmit timestamp request i, block m in the blockchain 530 is the most recent block. The ledger server 520 can generate a hash of block m and transmit the timestamp request i including the hash of block m to the trust time server 510.

The ledger server 520 can include a timer counting a time after transmitting a first timestamp request, e.g., timestamp request i for block m. When the timer counts to the triggering time period, the ledger server 520 can be triggered to transmit a second timestamp request, e.g., timestamp request i+1, to the trust time server 510. The timestamp request i+1 can include a hash of the most recent block generated in the blockchain 530, e.g., block n, when the ledger server 520 is triggered to transmit the timestamp request i+1.

As illustrated in FIG. 5, after transmitting the timestamp request i for block m, the ledger server 520 receives a first timestamp and associated signature for block m from the trust time server 510. The ledger server 520 can store information of the first timestamp and associated signature as a transaction in block m+1 that is immediately subsequent to block m in the blockchain 530. The information of the first timestamp and associated signature can include, for example, at least one of the first timestamp and associated signature or a hash of the first timestamp and associated signature. Block m+1 storing the information of the first timestamp and associated signature for block m is a timestamped block in the blockchain 530. Block m+1 can also store a hash of block m, such that block m+1 is anchored to block m in the blockchain 530. In some embodiments, the information of the timestamp and associated signature can be stored in the block m+1 as a transaction. In some cases, block m+1 includes other transaction data besides the information of the timestamp and associated signature for block n. In some cases, block m+1 is a block exclusively storing the information of the timestamp and associated signature for block m.

Similarly, as illustrated in FIG. 5, after transmitting the timestamp request i+1 for block n, the ledger server 520 receives a second timestamp and associated signature for block n. The ledger server 520 stores information of the second timestamp and associated signature as a transaction in block n+1 that is immediately subsequent to block n in the blockchain 530. Block n+1 storing the second information of the timestamp and associated signature for block n is a timestamped block in the blockchain 530. Block n+1 can also store a hash of block n, such that block n+1 is anchored to block n in the blockchain 530.

As shown in FIG. 5, block m+1 and block n+1 are adjacent to each other among the timestamped blocks generated in the blockchain 530. Specifically, block m+1 is a timestamped block that stores the first timestamp and associated signature for block m, and block n+1 is a timestamped block that stores the second timestamp and associated signature for block n received from the trust time server 510. The second timestamp and associated signature for block n is received immediately subsequent to the first timestamp and associated signature for block m among trust timestamp information received by the ledger server 520 from the trust time server 510. Other blocks, e.g., from block m+2 to block n, between the adjacent timestamped blocks, block m+1 and block n+1, do not store trust timestamp information from the trust time server 510. Each of the block m+1 to block n+1 can be referred to as a non-timestamped block.

A hash tangle exists between any two adjacent blocks (either a timestamped block or non-timestamped block) in the blockchain 530 because each of the blocks, e.g., block m to block n+2, in the blockchain 530 is anchored to each other by storing a hash of a immediately precedent block 530. For example, block m+1 stores a hash of an immediately in the blockchain precedent block, block m, in a block header of block m+1. Similarly, block n+1 stores a hash of block n in a block header of block m+1.

In some embodiments, a hash tangle can be added to between any two adjacent timestamped blocks to provide enhanced immutability, trustworthiness, and verifiability of the blocks in the blockchain 530. For example, the adjacent timestamped blocks, block m+1 and block n+1, can be anchored or linked together in the blockchain 530. The non-timestamped blocks between them, block m+2 to block n, can be determined to be generated at time points between the first timestamp stored in block m+1 and the second timestamp stored in block n+1. The timestamped blocks being anchored together can include that a timestamped block stores information that uniquely identifies a preceding timestamped block immediately before the timestamped block among the timestamped blocks in the blockchain. The information can be stored in a block header or a block body of the timestamped block.

In some embodiments, the timestamp request i+1 includes information of a previous timestamped block that is the most recent timestamped block generated in the blockchain 530, i.e., block m+1 in the example shown in FIG. 5. The information can include at least one of a hash of block m+1 or a block identifier, i.e., m+1, of block m+1. In such a way, the two adjacent timestamped blocks n+1 and m+1 can be anchored to each other.

In some embodiments, block n+1, the timestamped block immediately subsequent to the previous timestamped block, i.e., block m+1, stores information of block m+1. The information of block m+1 includes at least one of the hash of block m+1 or the block identifier m+1 of block m+1. In such a way, the two adjacent timestamped blocks n+1 and m+1 can be anchored to each other.

In a particular embodiment, the timestamp request i+1 includes the hash of block n and at least one of the hash of block m+1 or the block identifier m+1. The timestamped block n+1 also includes the hash of block n and at least one of the hash of block m+1 or the block identifier m+1.

In some embodiments, a timestamp request can be disregarded if the ledger server 520 has not received a reply from the trust time server 510 within a predetermined tolerance time period after the timestamp request is transmitted by the ledger server 520 to the trust time server 510. The ledger server 520 can then wait to transmit a next timestamp request immediately subsequent to the disregarded timestamp request when a periodical triggering time arrives. Thus, two adjacent timestamped blocks among the timestamped blocks in the blockchain 530 can correspond to two respective timestamp requests that are not adjacent among the timestamp requests transmitted from the ledger server 520 and can be separated from one or more disregarded timestamp requests between the two respective timestamp requests.

Figure 6:
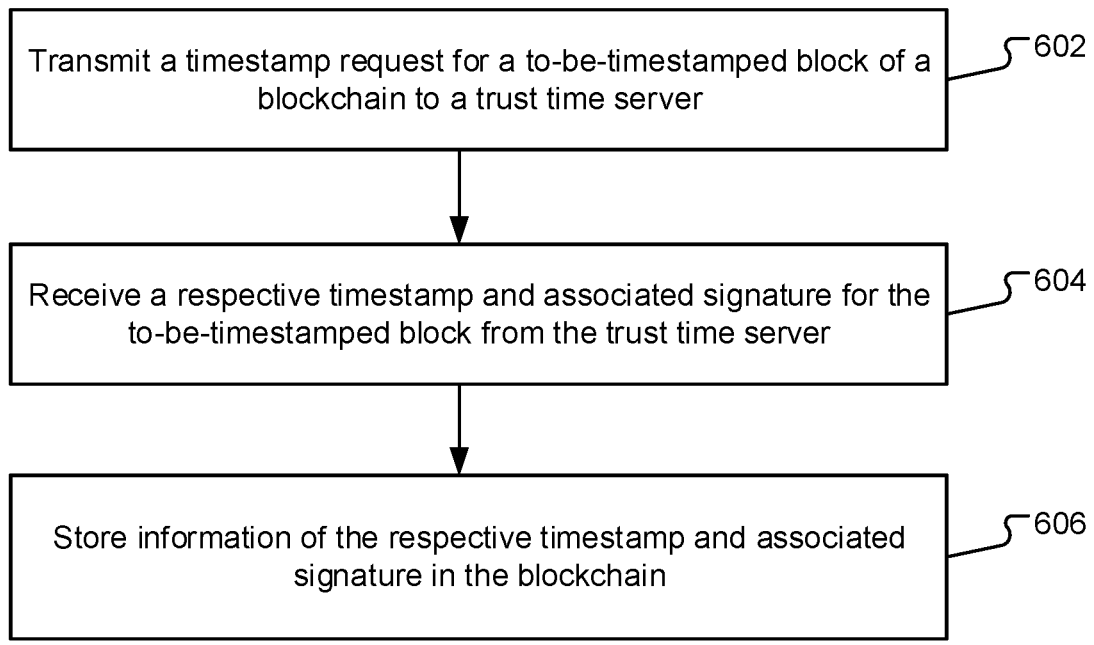
FIG. 6 is a flowchart illustrating an example of a process that can be executed in accordance with embodiments of this specification.

FIG. 6 is a flowchart illustrating an example of a process 600 for implementation of timestamp services that can be executed in accordance with embodiments of this specification. For convenience, the process 600 will be described as being performed by a system of one or more computers, located in one or more locations, and programmed appropriately in accordance with this specification. For example, a ledger server in a blockchain-based centralized ledger system can perform the process 600. The centralized ledger system can be an example of the centralized ledger system 310 of FIG. 3. The ledger server can be an example of the ledger server 320 of FIG. 3, the ledger server 420 of FIG. 4A, 470 of FIG. 4B, or the ledger server 520 of FIG. 5.

At 602, a timestamp request for a to-be-timestamped block of a blockchain is transmitted from the ledger server to a trust time server. The trust time server is independent from the centralized ledger system and can be associated with a trust time authority. The trust time server can be, for example, the time server 350 of FIG. 3, the time server 430 of FIGS. 4A-4B, or the time server 510 of FIG. 5. The blockchain can be, for example, the blockchain 322 of FIG. 3 or the blockchain 530 of FIG. 5. The blockchain can include multiple blocks for storing transaction data. The to-be-timestamped block can be the most current block generated in the blockchain when the timestamp request is transmitted. The timestamp request can include a hash of the to-be-timestamped block.

At 604, a timestamp and associated signature for the to-be-timestamped block is received from the trust time server. The timestamp and associated signature is associated with the timestamp request that includes information of the to-be-timestamped block.

At 606, information of the timestamp and associated signature for the to-be-timestamped block is stored in the blockchain. In some embodiments, the ledger server can generate a timestamped block in the blockchain to include the information of the timestamp and associated signature for the to-be-timestamped block, for example, as a transaction in a block body of the timestamped block. In some embodiments, the information of the timestamps and associated signature for the to-be-timestamped block is stored in a block header of the timestamped block.

In some embodiments, the timestamped block is a block immediately subsequent to the to-be-timestamped block in the blockchain. In some embodiments, the information of the timestamps and associated signature include, for example, at least one of the timestamp and associated signature or a hash of the timestamp and associated signature. For example, the timestamped block can store a hash of the to-be-timestamped block. In some embodiments, a block body of the timestamped block includes no other transaction data except the at least one of the timestamp and associated signature or the hash of the timestamp and associated signature. In some embodiments, a block body of the timestamped block includes other transaction data in addition to the information of the timestamps and associated signature for the to-be-timestamped block.

In some embodiments, the ledger server may transmit timestamp requests to the trust time server from time to time, on demand, or based on the number of the blocks generated by the ledger server. In some embodiments, the ledger server can periodically transmit timestamp requests for to-be-timestamped blocks in the blockchain to the time server with a predetermined triggering time period. The predetermined triggering time period can be associated with a corresponding cost for a timestamp service of the centralized ledger system. The predetermined triggering time period can be predetermined by a client (or a user) associated with the centralized ledger system.

In some embodiments, the ledger server is configured to periodically generate blocks in the blockchain with a predetermined time period of block generation. The predetermined triggering time period can be the same or different from the predetermined time period of block generation. The predetermined triggering time period can be longer than the predetermined time period of block generation so that not every block is being timestamped, for example, due to the cost of obtaining the timestamp from the trust time server. In some embodiments, the ledger server may not generate blocks periodically. For example, the ledger server may generate blocks on demand or based on the number of the transactions received by the ledger server. For example, the ledger server may generate a new block upon receiving a predetermined number of transactions.

In some embodiments, after transmit timestamp requests for to-be-timestamped blocks in the blockchain to the trust time server, the ledger server can receive respective timestamps and associated signatures for the to-be-timestamped blocks from the trust time server, and store information of the respective timestamps and associated signatures for the to-be-timestamped blocks in timestamped blocks in the blockchain. For example, a first timestamp request for a first to-be-timestamped block of the to-be-timestamped blocks in the blockchain is transmitted to the trust time server at a first time point, and the first to-be-timestamped block is a first most current block in the blockchain at the first time point. The first timestamp request can include a first hash of the first to-be-timestamped block. A second timestamp request for a second to-be-timestamped block of the to-be-timestamped blocks in the blockchain is transmitted to the trust time server at a second time point after the first time point, and the second to-be-timestamped block is a second most current block in the blockchain at the second time point. The second timestamp request can include a second cryptographic cash of the second to-be-timestamped block.

In some cases, the second timestamp request is immediately subsequent to the first timestamp request among the individual timestamp requests transmitted from the ledger server to the trust time server. In some cases, the second timestamp request is not immediately subject to the first timestamp request and separated from one or more timestamp requests that are disregarded by the ledger server, for example, because the ledger server does not receive a reply from the trust time server within a predetermined tolerance time period.

After transmitting the first timestamp request, the ledger server can receive a first respective timestamp and associated signature for the first to-be-timestamped block from the trust time server and store information of the first respective timestamp and associated signature in a first timestamped block immediately subsequent to the first to-be-timestamped block in the blockchain. After transmitting the second timestamp request, the ledger server can receive a second respective timestamp and associated signature for the second to-be-timestamped block from the trust time server, and store information of the second respective timestamp and associated signature in a second timestamped block immediately subsequent to the second to-be-timestamped block in the blockchain. The second respective timestamp and associated signature can be immediately subsequent to the first respective timestamp and associated signature among the respective timestamps and associated signatures for the to-be-timestamped blocks from the trust time server. The second timestamped block can be immediately subsequent to the first timestamped block among the timestamped blocks in the blockchain.

In some embodiments, the second timestamped block can be anchored to the first timestamped block in the blockchain. For example, the second timestamp request can include information that uniquely identifies the first timestamped block. The information that uniquely identifies the first timestamped block can include at least one of a hash of the first timestamped block or a first respective block identifier for the first timestamped block, where each of the multiple blocks is associated with a respective block identifier, and the multiple blocks are stored in order in the blockchain according to the respective block identifiers. In some embodiments, the second timestamped block can include information that uniquely identifies the first timestamped block. The information that uniquely identifies the first timestamped block can include at least one of the hash of the first timestamped block or the first respective block identifier for the first timestamped block.

In some embodiments, the first respective block identifier of the first timestamped block can be separated from a second respective block identifier of the second timestamped block by other block identifiers of other blocks between the first timestamped block and the second timestamped block in the blockchain. The other blocks do not store trust timestamp information from the trust time server (and can be referred to as non-timestamped blocks). If the adjacent timestamped blocks, the first and second timestamped blocks are anchored or linked together in the blockchain, the other blocks between them can be determined to be generated at time points between the first timestamp stored in the first timestamped block and the second timestamp stored in the second timestamped block.

Figure 7:
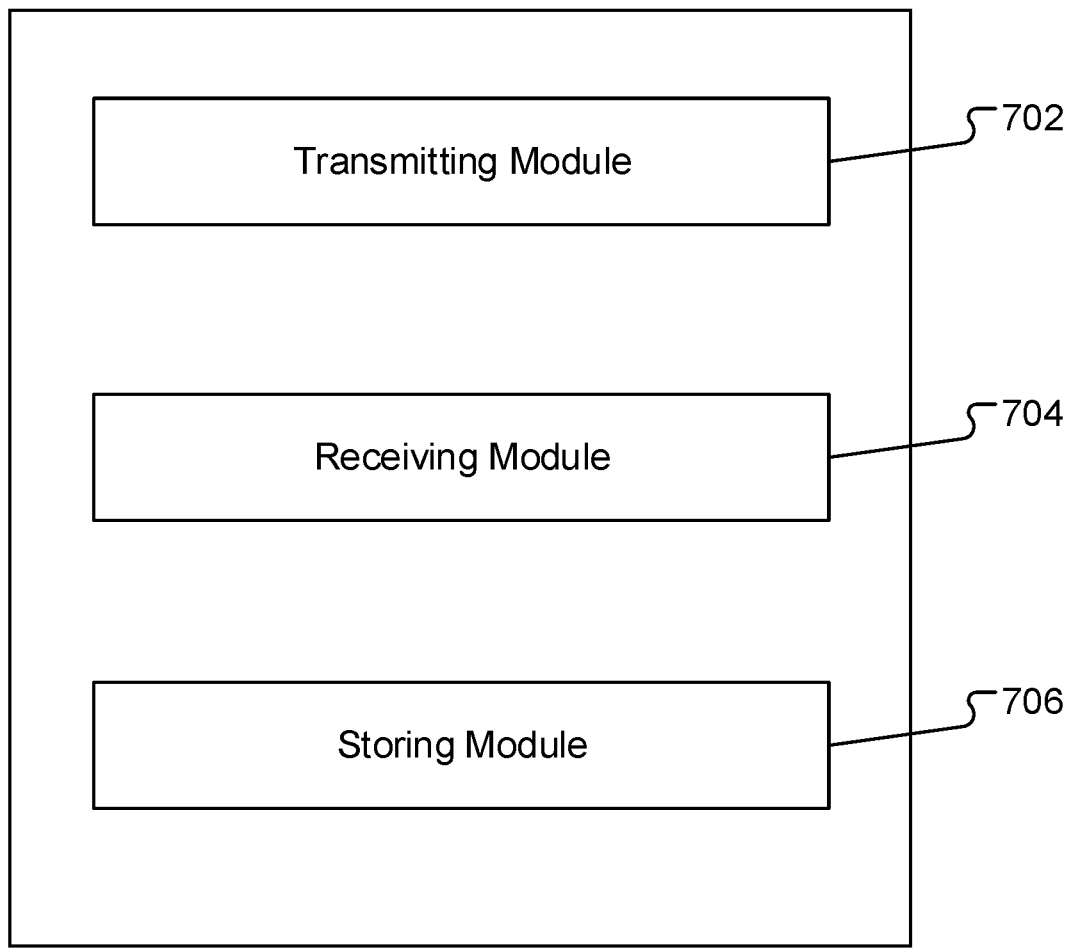
FIG. 7 depicts examples of modules of an apparatus in accordance with embodiments of this specification.

FIG. 7 depicts examples of modules of an apparatus 700 in accordance with embodiments of this specification. The apparatus 700 can be an example of an embodiment of a blockchain-based centralized ledger system configured to provide ledger services and/or trust timestamp services for transaction data stored in the centralized ledger system. The apparatus 700 can correspond to the embodiments described above, and the apparatus 700 includes the following: a transmitting module 702 that transmit a timestamp request for a to-be-timestamped block in a blockchain to a trust time server that is associated with a trust time authority and independent from the centralized ledger system, the blockchain including a plurality of blocks storing transaction data; a receiving module 704 that receives a timestamp and associated signature for the to-be-timestamped block from the trust time server; and a storing module 706 that stores information of the timestamp and associated signature for the to-be-timestamped block in the blockchain.

In an optional embodiment, the storing module 706 is configured to store at least one of the timestamp and associated signature or a hash of the timestamp and associated signature in a second block immediately subsequent to the to-be-timestamped block in the blockchain, where the second block immediately subsequent to the to-be-timestamped block stores a hash of the to-be-timestamped block.

In an optional embodiment, a block body of the second block immediately subsequent to the to-be-timestamped block includes no other transaction data except the at least one of the timestamp and associated signature or the hash of the timestamp and associated signature.

In an optional embodiment, the to-be-timestamped block is a most recent block generated in the blockchain when the timestamp request is transmitted.

In an optional embodiment, the timestamp request includes a hash of the to-be-timestamped block.

In an optional embodiment, the transmitting module 702 is configured to periodically transmit timestamp requests for to-be-timestamped blocks in the blockchain to the trust time server at a predetermined triggering time period.

In an optional embodiment, the predetermined triggering time period is associated with a corresponding cost for a timestamp service of the centralized ledger system.

In an optional embodiment, the predetermined triggering time period is predetermined by a user associated with the centralized ledger system.

In an optional embodiment, the apparatus further includes a generating module that periodically generates the plurality of blocks in the blockchain with a predetermined block generation time period, and the predetermined block generation time period is shorter than the predetermined triggering time period.

In an optional embodiment, the receiving module 704 is configured to receive respective timestamps and associated signatures for the to-be-timestamped blocks from the trust time server by the computing device, and the storing module 706 is configured to store information of the respective timestamps and associated signatures for the to-be-timestamped blocks in timestamped blocks in the blockchain by the computing device.

In an optional embodiment, the timestamped block includes a first timestamped block storing information of a first respective timestamp and associated signature for a first to-be-timestamped block that is immediately before the first timestamped block in the blockchain, and a second timestamped block storing information of a second respective timestamp and associated signature for a second to-be-timestamped block that is immediately before the second timestamped block in the blockchain. The second respective timestamp and associated signature is immediately subsequent to the first respective timestamp and associated signature among the respective timestamps and associated signatures for the to-be-timestamped blocks, and the second timestamped block is immediately subsequent to the first timestamped block among the timestamped blocks in the blockchain.

In an optional embodiment, each of the plurality of blocks is associated with a respective block identifier, and the plurality of blocks are stored in order in the blockchain according to the respective block identifiers, and a first block identifier of the first timestamped block is separated from a second block identifier of the second timestamped block by other block identifiers of other blocks between the first timestamped block and the second timestamped block in the blockchain, the other blocks storing no trust timestamp information from the trust time server.

The system, apparatus, module, or unit illustrated in the previous embodiments can be implemented by using a computer chip or an entity, or can be implemented by using a product having a certain function. A typical embodiment device is a computer (and the computer can be a personal computer), a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 7, it can be interpreted as illustrating an internal functional module and a structure of a blockchain-based centralized ledger implementation apparatus. The blockchain-based centralized ledger implementation apparatus can be an example of a centralized ledger system configured to provide ledger services and trust timestamp services for transaction data stored in the centralized ledger system. An execution body in essence can be an electronic device, and the electronic device includes the following: one or more processors; and one or more computer-readable memories configured to store an executable instruction of the one or more processors. In some embodiments, the one or more computer-readable memories are coupled to the one or more processors and have programming instructions stored thereon that are executable by the one or more processors to perform algorithms, methods, functions, processes, flows, and procedures, as described in this specification.

Described embodiments of the subject matter can include one or more features, alone or in combination. For example, in a first embodiment, a method includes: transmitting a timestamp request for a to-be-timestamped block in a blockchain to a trust time server by a computing device in the centralized ledger system that stores data in the blockchain, the trust time server being associated with a trust time authority and independent from the centralized ledger system, the blockchain including a plurality of blocks storing transaction data; receiving a timestamp and associated signature for the to-be-timestamped block from the trust time server by the computing device; and storing information of the timestamp and the associated signature for the to-be-timestamped block in the blockchain by the computing device.

The foregoing and other described embodiments can each, optionally, include one or more of the following features:

A first feature, combinable with any of the following features, specifies that storing information of the respective timestamp and the associated signature for the to-be-timestamped block in the blockchain includes: storing at least one of the timestamp and the associated signature or a hash of the timestamp and the associated signature in a second block immediately subsequent to the to-be-timestamped block in the blockchain, where the second block stores a hash of the to-be-timestamped block.

A second feature, combinable with any of the previous or following features, specifies that a block body of the second block comprises no other transaction data except the at least one of the timestamp and associated signature or the hash of the timestamp and the associated signature.

A third feature, combinable with any of the previous or following features, specifies that the to-be-timestamped block is a most recent block generated in the blockchain when the timestamp request is transmitted.

A fourth feature, combinable with any of the previous or following features, specifies that the timestamp request includes a hash of the to-be-timestamped block.

A fifth feature, combinable with any of the previous or following features, further includes: periodically transmit timestamp requests for to-be-timestamped blocks in the blockchain to the trust time server with a predetermined triggering time period by the computing device.

A sixth feature, combinable with any of the previous or following features, specifies that the predetermined triggering time period is associated with a corresponding cost for a timestamp service of the centralized ledger system.

A seventh feature, combinable with any of the previous or following features, specifies the predetermined triggering time period is predetermined by a user associated with the centralized ledger system.

An eight feature, combinable with any of the previous or following features, specifies that the computing device is configured to periodically generate the plurality of blocks in the blockchain with a predetermined block generation time period, and the predetermined block generation time period is shorter than the predetermined triggering time period.

A ninth feature, combinable with any of the previous or following features, further includes: receiving respective timestamps and associated signatures for the to-be-timestamped blocks from the trust time server by the computing device; and storing information of the respective timestamps and associated signatures for the to-be-timestamped blocks in timestamped blocks in the blockchain by the computing device.

A tenth feature, combinable with any of the previous or following features, specifies that the timestamped blocks include a first timestamped block storing information of a first respective timestamp and associated signature for a first to-be-timestamped block that is immediately before the first timestamped block in the blockchain, and a second timestamped block storing information of a second respective timestamp and associated signature for a second to-be-timestamped block that is immediately before the second timestamped block in the blockchain, where the second respective timestamp and associated signature is immediately subsequent to the first respective timestamp and associated signature among the respective timestamps and associated signatures for the to-be-timestamped blocks, and where the second timestamped block is immediately subsequent to the first timestamped block among the timestamped blocks in the blockchain.

An eleventh feature, combinable with any of the previous or following features, specifies that each of the plurality of blocks is associated with a respective block identifier, and the plurality of blocks are stored in order in the blockchain according to the respective block identifiers, and a first block identifier of the first timestamped block is separated from a second block identifier of the second timestamped block by other block identifiers of other blocks between the first timestamped block and the second timestamped block in the blockchain, the other blocks storing no trust timestamp information from the trust time server.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for managing a blockchain-based centralized ledger system, the computer-implemented method comprising:
    transmitting a timestamp request for a to-be-timestamped block in a blockchain to a trust time server by a computing device in the blockchain-based centralized ledger system that stores data in the blockchain, the trust time server being associated with a trust time authority and independent from the blockchain-based centralized ledger system, the blockchain including a plurality of blocks storing transaction data;
    receiving a timestamp and associated signature for the to-be-timestamped block from the trust time server by the computing device;
    storing information of the timestamp and the associated signature for the to-be-timestamped block in the blockchain by the computing device; and
    periodically transmit timestamp requests for to-be-timestamped blocks in the blockchain to the trust time server with a predetermined triggering time period by the computing device.

2. The computer-implemented method of claim 1, wherein storing information of the timestamp and the associated signature for the to-be-timestamped block in the blockchain comprises:
    storing at least one of the timestamp and the associated signature or a hash of the timestamp and the associated signature in a second block immediately subsequent to the to-be-timestamped block in the blockchain,
    wherein the second block stores a hash of the to-be-timestamped block.

3. The computer-implemented method of claim 2, wherein a block body of the second block comprises no other transaction data except the at least one of the timestamp and associated signature or the hash of the timestamp and the associated signature.

4. The computer-implemented method of claim 1, wherein the to-be-timestamped block is a most recent block generated in the blockchain when the timestamp request is transmitted.

5. The computer-implemented method of claim 1, wherein the timestamp request comprises a hash of the to-be-timestamped block.

6. The computer-implemented method of claim 1, wherein the predetermined triggering time period is associated with a corresponding cost for a timestamp service of the blockchain-based centralized ledger system.

7. The computer-implemented method of claim 1, wherein the predetermined triggering time period is predetermined by a client associated with the blockchain-based centralized ledger system.

8. The computer-implemented method of claim 1, wherein the computing device is configured to periodically generate the plurality of blocks in the blockchain with a predetermined time period of block generation, and wherein the predetermined time period of block generation is shorter than the predetermined triggering time period.

9. The computer-implemented method of claim 1, further comprising:
    receiving respective timestamps and associated signatures for the to-be-timestamped blocks from the trust time server by the computing device; and
    storing information of the respective timestamps and associated signatures for the to-be-timestamped blocks in timestamped blocks in the blockchain by the computing device.

10. The computer-implemented method of claim 9, wherein the timestamped blocks comprise:
- a first timestamped block storing information of a first respective timestamp and associated signature for a first to-be-timestamped block that is immediately before the first timestamped block in the blockchain; and
- a second timestamped block storing information of a second respective timestamp and associated signature for a second to-be-timestamped block that is immediately before the second timestamped block in the blockchain, wherein the second respective timestamp and associated signature is immediately subsequent to the first respective timestamp and associated signature among the respective timestamps and associated signatures for the to-be-timestamped blocks, and wherein the second timestamped block is immediately subsequent to the first timestamped block among the timestamped blocks in the blockchain.

11. The computer-implemented method of claim 10, wherein each of the plurality of blocks is associated with a respective block identifier, and the plurality of blocks are stored in order in the blockchain according to the respective block identifiers, and wherein a first block identifier of the first timestamped block is separated from a second block identifier of the second timestamped block by other block identifiers of other blocks between the first timestamped block and the second timestamped block in the blockchain, the other blocks storing no trust timestamp information from the trust time server.

12. A non-transitory, computer-readable medium storing one or more instructions executable by a computer system to perform operations for managing a blockchain-based centralized ledger system, comprising:
- transmitting a timestamp request for a to-be-timestamped block in a blockchain to a trust time server by a computing device in the blockchain-based centralized ledger system that stores data in the blockchain, the trust time server being associated with a trust time authority and independent from the blockchain-based centralized ledger system, the blockchain including a plurality of blocks storing transaction data;
- receiving a timestamp and associated signature for the to-be-timestamped block from the trust time server by the computing device;
- storing information of the timestamp and the associated signature for the to-be-timestamped block in the blockchain by the computing device; and
- periodically transmit timestamp requests for to-be-timestamped blocks in the blockchain to the trust time server with a predetermined triggering time period by the computing device.

13. The non-transitory, computer-readable medium of claim 12, wherein storing information of the timestamp and the associated signature for the to-be-timestamped block in the blockchain comprises:
- storing at least one of the timestamp and the associated signature or a hash of the timestamp and the associated signature in a second block immediately subsequent to the to-be-timestamped block in the blockchain,
- wherein the second block stores a hash of the to-be-timestamped block.

14. The non-transitory, computer-readable medium of claim 13, wherein a block body of the second block comprises no other transaction data except the at least one of the timestamp and associated signature or the hash of the timestamp and the associated signature.

15. The non-transitory, computer-readable medium of claim 12, wherein the to-be-timestamped block is a most recent block generated in the blockchain when the timestamp request is transmitted.

16. The non-transitory, computer-readable medium of claim 12, wherein the timestamp request comprises a hash of the to-be-timestamped block.

17. The non-transitory, computer-readable medium of claim 12, wherein the predetermined triggering time period is associated with a corresponding cost for a timestamp service of the blockchain-based centralized ledger system.

18. The non-transitory, computer-readable medium of claim 12, wherein the predetermined triggering time period is predetermined by a client associated with the blockchain-based centralized ledger system.

19. The non-transitory, computer-readable medium of claim 12, wherein the computing device is configured to periodically generate the plurality of blocks in the blockchain with a predetermined time period of block generation, and wherein the predetermined time period of block generation is shorter than the predetermined triggering time period.

20. The non-transitory, computer-readable medium of claim 12, the operations further comprising:
- receiving respective timestamps and associated signatures for the to-be-timestamped blocks from the trust time server by the computing device; and
- storing information of the respective timestamps and associated signatures for the to-be-timestamped blocks in timestamped blocks in the blockchain by the computing device.

21. The non-transitory, computer-readable medium of claim 20, wherein the timestamped blocks comprise:
- a first timestamped block storing information of a first respective timestamp and associated signature for a first to-be-timestamped block that is immediately before the first timestamped block in the blockchain; and
- a second timestamped block storing information of a second respective timestamp and associated signature for a second to-be-timestamped block that is immediately before the second timestamped block in the blockchain, wherein the second respective timestamp and associated signature is immediately subsequent to the first respective timestamp and associated signature among the respective timestamps and associated signatures for the to-be-timestamped blocks, and wherein the second timestamped block is immediately subsequent to the first timestamped block among the timestamped blocks in the blockchain.

22. The non-transitory, computer-readable medium of claim 21, wherein each of the plurality of blocks is associated with a respective block identifier, and the plurality of blocks are stored in order in the blockchain according to the respective block identifiers, and wherein a first block identifier of the first timestamped block is separated from a second block identifier of the second timestamped block by other block identifiers of other blocks between the first timestamped block and the second timestamped block in the blockchain, the other blocks storing no trust timestamp information from the trust time server.

23. A computer-implemented system for managing a blockchain-based centralized ledger system, comprising:
- one or more processors; and
- one or more computer-readable memories coupled to the one or more processors and having instructions stored thereon that are executable by the one or more processors to perform one or more operations comprising:

transmitting a timestamp request for a to-be-timestamped block in a blockchain to a trust time server by a computing device in the blockchain-based centralized ledger system that stores data in the blockchain, the trust time server being associated with a trust time authority and independent from the blockchain-based centralized ledger system, the blockchain including a plurality of blocks storing transaction data;

receiving a timestamp and associated signature for the to-be-timestamped block from the trust time server by the computing device;

storing information of the timestamp and the associated signature for the to-be-timestamped block in the blockchain by the computing device; and periodically transmit timestamp requests for to-be-timestamped blocks in the blockchain to the trust time server with a predetermined triggering time period by the computing device.

24. The computer-implemented system of claim 23, wherein storing information of the timestamp and the associated signature for the to-be-timestamped block in the blockchain comprises:

storing at least one of the timestamp and the associated signature or a hash of the timestamp and the associated signature in a second block immediately subsequent to the to-be-timestamped block in the blockchain, wherein the second block stores a hash of the to-be-timestamped block.

25. The computer-implemented system of claim 24, wherein a block body of the second block comprises no other transaction data except the at least one of the timestamp and associated signature or the hash of the timestamp and the associated signature.

26. The computer-implemented system of claim 23, wherein the to-be-timestamped block is a most recent block generated in the blockchain when the timestamp request is transmitted.

27. The computer-implemented system of claim 23, wherein the timestamp request comprises a hash of the to-be-timestamped block.

28. The computer-implemented system of claim 23, wherein the predetermined triggering time period is associated with a corresponding cost for a timestamp service of the blockchain-based centralized ledger system.

29. The computer-implemented system of claim 23, wherein the predetermined triggering time period is predetermined by a client associated with the blockchain-based centralized ledger system.

30. The computer-implemented system of claim 23, wherein the computing device is configured to periodically generate the plurality of blocks in the blockchain with a predetermined time period of block generation, and wherein the predetermined time period of block generation is shorter than the predetermined triggering time period.

* * * * *